United States Patent Office 2,737,509
Patented Mar. 6, 1956

2,737,509

CARBOXYLIC ACID SALTS OF N-DIALKYL-AMINOALKYLAMIDES

Murray Jelling, Whitestone, N. Y.

No Drawing. Application November 19, 1953,
Serial No. 393,244

10 Claims. (Cl. 260—97.5)

This invention relates to bituminous compositions of the type that are mixed with mineral aggregates in the construction of asphalt pavements. More particularly the invention relates to a novel group of bonding agents which are adapted to be incorporated in such bituminous compositions and when so incorporated not only improve the bonding effectiveness of the bituminous composition but also exhibit improved thermal stability as compared with the bonding agents previously used. The present application is a continuation-in-part of my prior application Serial No. 196,929 filed November 21, 1950, now Patent No. 2,663,648. The claims of my parent application are particularly directed to bituminous compositions containing the novel bonding agents, whereas the claims of the present application are directed to certain of the bonding agents per se as new compositions of matter.

During the development of the art of improving the coating and bonding qualities of bituminous compositions when mixed with mineral aggregates in the construction of asphalt pavements, several types of chemical agents have been proposed and used. The use of these agents has made it possible to use wet aggregates in preparing paving mixtures, thereby obviating the necessity of having available dry aggregates. Thus, attendant delays in road construction have been eliminated. Also, the incorporation of bonding agents has permitted the use of hydrophilic aggregates, which could not otherwise be employed. In addition the incorporation of these chemical bonding agents has brought about an improvement in the structural stability of the finished bituminous pavement by increasing the resistance to separation of aggregate and bitumen caused by the detrimental action of water.

Thus, these agents have been useful in improving the method of asphalt road construction and in improving the quality and length of service of the finished pavement.

Chemical bonding agents of several types have been proposed and used, such as metallic soaps, fatty acids, surface active amines, amine soaps, and acylamidoamines and their soaps. The most useful, from the point of view of effectiveness, ease of application, and cost, have been those based on compositions of surface active organic amines such as described in patents to Louis A. Mikeska: No. 2,389,680, issued November 27, 1945; and James M. Johnson, Francis L. Mark and Murray Jelling: No. 2,514,954, issued July 11, 1950. The value of bonding agents, such as aminoalkylamides, polyaminoalkylamides, and their carboxylic acid salts, has been fully demonstrated in improving the coating of wet aggregates, bonding of bituminous materials to aggregates, and improving the long range stability of finished pavements by increasing the resistance to separation of aggregate and bitumen in the presence of water.

In many instances it is common practice to store the bituminous composition in tanks at an elevated temperature, 250–400° F., and maintain it in a fluid state, so that the composition may be readily removed without reheating, which would be necessary if the bituminous composition were allowed to cool and solidify. The period of storage may be as long as 14 days. As required, the asphalt is withdrawn and handled as is or mixed with hydrocarbon diluents in preparing cutback asphalts.

In other instances, quantities of asphalt or like bitumen are heated as high as 400–500° F. at the time of shipment so that its temperature upon arrival at the point of destination will have dropped to about 300–350° F., which is the desirable temperature required for proper application in preparing the paving mixture.

It has recently become apparent that many conventional types of bonding agents lose their effectiveness in a very short time when subjected to these high temperatures, i. e. temperatures in the range normally encountered with the storing and handling of bituminous materials. When the above described bonding agents are subjected to these high temperature conditions, their effectiveness is consequently lost in a short time and they are of little value as bonding agents.

As an example of this loss of effectiveness, samples of penetration grade asphalts containing a sufficient quantity of bonding agent to produce the desired coating, bonding, and resistance to the stripping action of water, were maintained at 325° F. for 24 hours. When paving mixtures were made, allowed to cure, and then immersed in water, the lack of resistance to stripping was readily apparent as compared to similar preparations, where the treated asphalts were not subjected to a high temperature, but were used in preparing the paving mixtures immediately after adding the bonding agent. As another example, when the treated penetration asphalts, after being maintained at 325° F. for 24 hours, were converted to cutback asphalts by adding petroleum naphtha, they were ineffective in coating wet stone and forming durable bonds with aggregates. By comparison, similarly treated samples, not subjected to the prolonged high temperature, upon conversion to cutback asphalts in a similar manner, were effective in coating wet stone, forming durable bonds with aggregates, and resisting the stripping action of water upon immersion of the paving mixtures in water.

In my prior application Serial No. 196,929 referred to above it was disclosed that the foregoing difficulties can be overcome by using as bonding agents certain N-dialkyl-aminoalkylamides and their carboxylic acid salts. Such bonding agents not only improve substantially the bonding effectiveness of bituminous compositions but also are sufficiently stable thermally to withstand the elevated temperatures frequently encountered in the processing of such bituminous compositions.

Moreover, while both the amides and their salts, when incorporated in bituminous compositions which are heated at elevated temperatures for extended periods as described in my parent application, are operative to improve the bonding effectiveness of the bituminous compositions, it has been found that the salts are substantially more effective than the amides. Thus it has been found that a given improvement in bonding effectiveness can be achieved by using a quantity of the salt that is significantly less than the quantity of the corresponding amide required to yield the same improvement in bonding effectiveness. In like manner if two bituminous compositions are prepared containing equal amounts by weight of the amide and its corresponding salt, the composition containing the salt exhibits a bonding effectiveness substantially superior to that of the composition containing the amide.

It has been thought that the effectiveness of compounds of this general type is due to the presence therein of a tertiary amine group and an amide group. However it is evident that on an equal weight basis the salts contain less of the tertiary amine and amide groups than do the corresponding amides. Hence the superiority of the salts is a surprising and unexpected result.

Salts capable of being incorporated in bituminous compositions to achieve the advantages indicated above can be represented by the general formula:

$$RCO-NR'-A-NR''_2.HO-OCR$$

wherein RCO is an acyl radical of an acid selected from the group consisting of $C_{12}$ to $C_{20}$ fatty acids and rosin acids; A is an alkylene group containing 2 to 6 carbon atoms; R' represents a hydrogen atom or an alkyl group containing 1 to 4 carbon atoms; and R'' represents an alkyl group containing 1 to 4 carbon atoms. In the above general formula the two RCO groups and the two R'' groups may be either the same or different radicals. The salts defined by this general formula are believed to be new and are claimed herein as new compounds.

Typical compounds that come within the scope of the above formula and are useful in accordance with the present invention include:

$$C_{17}H_{33}CONHCH_2CH_2N(CH_3)_2.HOOCR$$

named the rosin acid salts of N-(2-dimethylamino ethyl) oleamide, $C_{17}H_{33}CONHCH_2CH_2CH_2N(CH_3)_2.HOOCR$ named the rosin acid salts of N-(3-dimethylamino propyl) oleamide, $$C_{11}H_{23}CONHCH_2CH_2CH_2N(C_3H_7)_2.HOOCC_{17}H_{33}$$

named N-(3-diisopropylamino propyl) lauramide oleate, $$C_{17}H_{31}CON(CH_3)CH_2CH_2N(CH_3)C_3H_7.HOOCC_{11}H_{23}$$

named N-methyl-N(2-methylisopropylamino ethyl) linoleamide laurate, and $$C_{17}H_{33}CON(C_4H_9)CH_2CH_2CH_2$$
$$CH_2N(C_4H_9)_2.HOOCC_{17}H_{33}$$

named N-butyl-N-(4-dibutylamino butyl) oleamide oleate.

The salts of the present invention can be conveniently prepared by reacting an organic acid with a dialkylaminoalkylamine in either one or two steps. This is to say the amine can be first reacted with a limited quantity of acid to form an amide and the amide then reacted with a further quantity of the same or a different acid to form the salt; or alternatively, the amine may be mixed with a sufficient quantity of acid to form the salt in a single step.

Representative amines that can be used in this reaction include: $(CH_3)_2NCH_2CH_2CH_2NH_2$ named 3-dimethylamino propylamine, $(CH_3)_2NCH_2CH_2NH_2$ named 2-dimethylaminoethylamine, $(CH_3)_2NCH_2CH_2NHCH_3$ named 2-dimethylaminoethyl methylamine, $$(C_4H_9)_2NCH_2CH_2CH_2CH_2NHC_4H_9$$

named 4-dibutylaminobutyl butylamine, and $$C_3H_7(CH_3)NCH_2CH_2NHCH_3$$

named 2-methylisopropylaminoethyl methylamine.

Representative of the organic acids that may be used are oleic, linoleic, linolenic, lauric, palmitic, stearic, rosin acids, abietic acid, the mixed acids of tall oil, or mixtures of any of these acids. Triglycerides, such as vegetable and fish oils and animal fats, may be used as ingredients to supply the fatty acids required in carrying out the chemical preparation.

In cases where the salt is to be prepared in two steps, the amide can be first prepared by mixing equimolar quantities of the organic acid and dialkylaminoalkylamine and heating at 100° to 200° C. in a suitable container with suitable agitation. Upon mixing, the amine salt of the organic acid is formed and during the heating process the salt is molecularly dehydrated forming one mol of the N-dialkylaminoalkylamide with the elimination of one mol of water, as follows:

Reaction on mixing:

$$RCOOH + NHR'-A-NR''_2 \rightarrow \quad (1)$$
$$RCOOH.NHR'-A-NR''_2$$

and
$$RCOOH + NHR'-A-NR''_2 \rightarrow \quad (2)$$
$$RCOOH.NR''_2-A-NHR'$$

Reaction upon heating:
(1) $\rightarrow RCO-NR'-A-NR''_2 + H_2O$
(2) $\rightarrow$ (1) $\rightarrow RCO-NR'-A-NR''_2 + H_2O$ The course of the reaction and its completion may be followed by noting the diminishing proportion of carboxylic acid by titration with standard alkali and the diminishing proportion of titratable amine with standard acid. At the completion of the reaction there is substantially no organic acid present and the titratable alkali has been reduced to substantially one-half of its original value. The measurement of the eliminated water may also be useful as a guide in determining the completion of the reaction.

In preparing the carboxylic acid salts of the N-dialkylaminoalkylamides, equimolecular proportions of the N-dialkylaminoalkylamide and the organic acid are mixed together at any suitable temperature at which the components are liquids:

$$RCO-NR'-A-NR''_2 + RCOOH \rightarrow$$
$$RCO-NR'-A-NR''_2.HOOCR$$

Alternatively, all reactions may be carried out concurrently by mixing one mol of dialkylaminoalkylamine and two mols of organic acid and reacting the mixture at 100–200° C. in a suitable container with suitable agitation:

$$2RCOOH + NHR'-A-NR''_2 \rightarrow \quad (1)$$
$$RCOOH.NHR'-A-NR''_2.HOOCR$$
(1) $\rightarrow RCO-NR'-A-NR''_2.HOOCR + H_2O$ Surface active bonding agents prepared as described above may be utilized with any type of thermoplastic bituminous material, such as petroleum derived asphalts, tars, natural asphalts, road oils, asphalt and tar cutbacks prepared with hydrocarbon diluents and pitches obtained from all types of distillation or extraction residues. These surface active agents are readily dispersed in bituminous materials when all components are in the fluid state. For effective coating of wet aggregates with the treated bituminous composition, the thermally stable, surface active agent is added in the proportions of approximately 0.1 to 2.0 parts by weight per 100 parts of bituminous material.

Bituminous compositions incorporating the bonding agents of the present invention can be used in the preparation of paving compositions containing all of the usual types of aggregates such as gravel, crushed stone, sand or slag in either wet or dry condition. Also these agents are useful in the coating or bonding with bituminous compositions of other types of surfaces, such as metal, glass, wood, ceramics, plastics and paper, particularly when the surface to be treated is wet, or when the treated material is to be exposed to water under conditions which tend to cause a loss of strength of the bituminous bond.

In order to point out more fully the nature of the present invention the following illustrative examples are given of typical methods of preparing the amides and salts of the present invention.

*Example 1*

One mol of 3-dimethylamino propylamine was mixed with two mols of tall oil and the mixture was heated slowly to 150° C. and maintained at about 150° C. with constant agitation for 4 hours. During the reaction period approximately one mol of water was removed from the reaction mixture by distillation. Since the fatty acids of tall oil tend to react much more rapidly with an amine than do the rosin acids, the resulting product consisted principally of the rosin acid salts of N-(3-dimethylamino propyl) oleamide, N-(3-dimethylamino propyl) linoleamide, and N-(3-dimethylamino propyl) linolenamide.

One part by weight of the product as thus prepared was mixed with 100 parts by weight of asphalt cement at a temperature of 325° F. and maintained at this temperature for seven days. At the end of this period the asphalt cement was mixed with petroleum naphtha in the proper proportion to convert it to a cutback asphalt designated as RC-2. This cutback asphalt was mixed with wet aggregate to form a paving composition and it was found that the asphalt readily coated all of the aggregate particles and upon curing formed a strong bond throughout the mixture. When the paving composition was immersed in water it was found to be completely resistant to separation of the bitumen from the aggregate particles.

A comparable product can be made by reacting one mol of the 3-dimethylamino propylamine and two mols of oleic acid as described above to form the oleic acid salt of N-(3-dimethylamino) propyl oleamide.

*Example 2*

One mol of diethylaminoethylamine and two mols of oleic acid were reacted as in Example 1. The resulting product, the oleic acid salt of N-diethylaminoethyl oleamide having the formula $$C_{17}H_{33}CONHCH_2CH_2N(C_2H_5)_2 \cdot HOOCC_{17}H_{33}$$

was a thermally stable bituminous bonding agent.

A comparable product can be made by reacting the diethylaminoethylamine and two mols of tall oil to form the rosin acid salts of the N-diethylaminoethyl tall oil fatty acid amide.

*Example 3*

One mol of 3-dimethylamino propylamine was mixed with one mol of oleic acid and heated at 150°–160° C. with constant agitation for four hours. The resulting product was then mixed with one mol of rosin acid and agitated for a period of about 15 minutes to effect complete reaction of the amide and the rosin acid to form the rosin acid salt of the amide. The product obtained was similar in its effectiveness to that of Example 1.

*Example 4*

One mol of dimethylaminoethylamine and two mols of tall oil were mixed and reacted as in Example 1, to yield rosin acid salts of the tall oil fatty acid amides of this amine. The resulting product was a thermally stable, surface active bituminous bonding agent which maintained its effectiveness when dispersed in asphalt and like compositions and kept at temperatures of 300°–500° F. for several days.

*Example 5*

One mol of 3-diethylamino propylamine and two mols of oleic acid were mixed and heated as in Example 1, to form the oleic acid salt of N-(3-diethylamino propyl) oleamide. This product was found to be a thermally stable bonding agent when mixed with bituminous paving materials and maintained at elevated temperatures.

A comparable product can be made by reacting one mol of this amine with two mols of tall oil to form a rosin acid salt of the tall oil fatty acid amide of this amine.

*Example 6*

One mol of 3-dibutylamino propylamine was reacted with two mols of oleic acid according to the procedure of Example 1, to form an oleic acid salt of N-(3-dibutylamino propyl) oleamide. This product when incorporated in asphalt as described above was found to be a thermally stable bonding agent.

A comparable product can be made by reacting this amine with two mols of tall oil to form a rosin acid salt of the tall oil fatty acid amide of this amine.

It is of course to be understood that the foregoing examples are merely illustrative and that numerous other salts can be prepared which fall within the scope of the general formula disclosed above and claimed in the appended claims.

I claim:

1. As new thermally stable compounds adapted to be incorporated in bituminous bonding compositions for coating wet aggregates, carboxylic acid salts corresponding to the general formula:

$$RCO-NR'-A-NR''_2 \cdot HO-OCR$$

where RCO— is an acyl group derived from a carboxylic acid selected from the group consisting of $C_{12}$–$C_{20}$ fatty acids and rosin acids; A is an alkylene group containing from 2 to 6 carbon atoms; R' is a radical selected from the group consisting of hydrogen and alkyl radicals containing from 1 to 4 carbon atoms; and R'' is an alkyl group containing from 1 to 4 carbon atoms.

2. As new thermally stable compounds adapted to be incorporated in bituminous bonding compositions for coating wet aggregates, the carboxylic acid salts as in claim 1 wherein at least one RCO— is derived from a fatty acid containing 18 carbon atoms.

3. As new thermally stable compounds adapted to be incorporated in bituminous bonding compositions for coating wet aggregates, the carboxylic acid salts as in claim 1 wherein at least one RCO— is derived from rosin acids.

4. As new thermally stable compounds adapted to be incorporated in bituminous bonding compositions for coating wet aggregates, the carboxylic acid salts as in claim 1 wherein the RCO— groups are derived from tall oil.

5. As new thermally stable compounds adapted to be incorporated in bituminous bonding compositions for coating wet aggregates, the carboxylic acid salts as in claim 1 wherein the amido RCO— group is derived from a fatty acid containing 18 carbon atoms and the salt-forming acid is a rosin acid.

6. As a new thermally stable compound adapted to be incorporated in a bituminous bonding composition for coating wet aggregates, the rosin acid salt of the tall oil fatty acid amide of 3-dimethylamino propylamine.

7. As a new thermally stable compound adapted to be incorporated in a bituminous bonding composition for coating wet aggregates, the oleic acid salt of N-(3-dimethylamino propyl) oleamide.

8. As a new thermally stable compound adapted to be incorporated in a bituminous bonding composition for coating wet aggregates, the oleic acid salt of N-(2-diethylamino ethyl) oleamide.

9. As a new thermally stable compond adapted to be incorporated in a bituminous bonding composition for coating wet aggregates, the oleic acid salt of N-(3-diethylamino propyl) oleamide.

10. As a new thermally stable compound adapted to be incorporated in a bituminous bonding composition for coating wet aggregates, the rosin acid salt of the tall oil fatty acid amide of 2-dimethylamino ethylamine.

References Cited in the file of this patent

UNITED STATES PATENTS

| | | |
|---|---|---|
| 2,419,404 | Johnson | Apr. 22, 1947 |
| 2,459,062 | Cook et al. | Jan. 11, 1949 |
| 2,514,954 | Johnson et al. | July 11, 1950 |
| 2,663,648 | Jelling | Dec. 22, 1953 |